United States Patent [19]

Kanbara et al.

[11] 4,123,731
[45] Oct. 31, 1978

[54] GLASS FOR USE IN ULTRASONIC DELAY LINES

[75] Inventors: Tohru Kanbara; Michihiko Uemura, both of Yokohama; Nobuhiro Yokoo, Yokosuka, all of Japan

[73] Assignee: Asahi Glass Company, Ltd., Tokyo, Japan

[21] Appl. No.: 827,259

[22] Filed: Aug. 24, 1977

[30] Foreign Application Priority Data

Sep. 21, 1976 [JP] Japan ............................. 51-112500
Dec. 23, 1976 [JP] Japan ............................. 51-154229

[51] Int. Cl.$^2$ .......................... H03H 7/30; C03C 3/10; C03C 3/04
[52] U.S. Cl. ..................................... 333/30 R; 106/53
[58] Field of Search ....................... 106/53; 333/30 R

[56] References Cited

U.S. PATENT DOCUMENTS

| | | | |
|---|---|---|---|
| 3,198,642 | 8/1965 | Hagedorn | 106/53 |
| 3,238,151 | 3/1966 | Kim | 106/53 |
| 3,303,399 | 2/1967 | Hoogendoorn et al. | 106/53 |
| 3,421,916 | 1/1969 | Mikoda et al. | 106/53 |
| 3,598,619 | 8/1971 | Mikoda et al. | 106/53 |
| 3,672,921 | 6/1972 | Asahara et al. | 106/53 |
| 3,687,697 | 8/1972 | Faulstich et al. | 106/53 |
| 3,857,713 | 12/1974 | Inamura et al. | 106/53 |
| 3,973,976 | 8/1976 | Boyd | 106/53 |
| 4,018,613 | 4/1977 | Martin | 106/53 |
| 4,029,897 | 6/1977 | Mayer | 106/53 |

*Primary Examiner*—O. R. Vertiz
*Assistant Examiner*—Mark Bell
*Attorney, Agent, or Firm*—Oblon, Fisher, Spivak, McClelland & Maier

[57] ABSTRACT

A glass suitable for use in ultrasonic delay lines which comprises the components by weight, $SiO_2$ 42 to 27%, PbO 71 to 52% and preferably contains $K_2O$ and/or $Na_2O$. The glass further contains $PbF_2$, $BaF_2$, $KHF_2$, $K_2SiF_6$, $Na_2SiF_6$, ZnO, CdO, BaO, SrO, $ZrO_2$, $TiO_2$, $La_2O_3$, $Al_2O_3$, $B_2O_3$, $Sb_2O_3$ and $As_2O_3$.

This invention is characterized by a low rate of shear wave propagation (V) in the glass. The delay line can be used for a dropout compensator circuit of Video Tape Recorder or Video Disk Players.

12 Claims, No Drawings

GLASS FOR USE IN ULTRASONIC DELAY LINES

BACKGROUND OF THE INVENTION

1. Field of the Invention

This invention relates to a glass used in an ultrasonic delay line and more particularly, it relates to a glass having a rate of shear wave propagation (V) not exceeding 2.40 Km/sec.

2. Description of the Prior Arts

Heretofore, in order to miniaturize the glass used as delay medium for the ultrasonic delay line, the number of reflections of the wave in the glass delay medium has been increased. However, when the glass delay medium is miniaturized by increasing the number of reflections, spurious signals caused by diffraction of the waves in the delay medium has been disadvantageously increased.

The glass delay medium used in an ultrasonic delay line has been disclosed in U.S. Pat. No. 3,154,425 (Oct. 27, 1964); British Pat. No. 1,118,422 (July 3, 1968); British Pat. No. 1,232,933 (May 26, 1971) and British Pat. No. 1,290,213 (Sept. 20, 1972).

The glass delay medium disclosed in these prior arts has a large rate of shear wave propagation (V) whereby it has been difficult to miniaturize the glass delay medium without increasing the spurious signals.

SUMMARY OF THE INVENTION

It is an object of the present invention to provide an ultrasonic delay line having a miniaturized glass delay medium without increasing spurious signals by using glass having a small rate of shear wave propagation (V).

It is another object of the present invention to provide a glass delay medium for an ultrasonic delay line which has low melting temperature and is stable and is easily processed.

These and other objects of the present invention have been attained by use of a glass delay medium which comprises the components by weight percent, $SiO_2$ 42 to 27; PbO 71 to 52; $PbF_2$ 10 to 0; $BaF_2$ 10 to 0; $KHF_2$ 9 to 0; $K_2SiF_6$ 7 to 0; $Na_2SiF_6$ 5 to 0; $K_2O$ 12 to 0; $Na_2O$ 6 to 0; ZnO 6 to 0; CdO 6 to 0; BaO 10 to 0; SrO 6 to 0; $ZrO_2$ 5 to 0; $TiO_2$ 5 to 0; $La_2O_3$ 7 to 0; $Al_2O_3$ 5 to 0; $B_2O_3$ 9 to 0; $Sb_2O_3 + As_2O_3$ 2 to 0.

DETAILED DESCRIPTION OF THE PREFERRED EMBODIMENTS

In general, a conventional ultrasonic delay line comprises a delay medium such as glass, an input transducer for converting electronic signals to the corresponding mechanical vibrations, preferably shear waves, and an output transducer for converting the mechanical vibrations to the corresponding electric signals, the input transducer and the output transducer being made of a piezo-electric material, for example, quartz or lead zirconate titanate.

Ultrasonic delay lines having said structure are indispensable for VTR (video tape recorder) or VD (video disk players).

The delay lines used in the dropout compensator circuit for these equipment are required to have a temperature coefficient of delay time (TCDT) within the range about $\pm 6.7 \times 10^{-5}/°$ C.($-10°$ to $60°$ C.).

The other electronic components used in the video equipments have, for the most part, already replaced by soild-state devices and ICs. Accordingly, it has been intensely required to miniaturize the delay line as the other devices.

In the present invention, the glass having a rate of sheer wave propagation (V) not exceeding 2.40 Km/sec., preferably not exceeding 2.30 Km/sec. is used as the delay medium for the ultrasonic delay line, whereby the delay medium can be miniaturized without increasing the number of reflections that is, without increasing the spurious signals.

The melting temperature of the glass is remarkably low as 990° to 1150° C. whereby the preparation of the delay medium is quite easy and the glass is stable.

In accordance with the present invention, a glass delay medium used in an ultrasonic delay line consists essentially of,

|  | weight percent |
|---|---|
| $SiO_2$ | 42 to 27 |
| PbO | 71 to 52 |
| $PbF_2$ | 10 to 0 |
| $BaF_2$ | 10 to 0 |
| $KHF_2$ | 9 to 0 |
| $K_2SiF_6$ | 7 to 0 |
| $Na_2SiF_6$ | 5 to 0 |
| $K_2O$ | 12 to 0 |
| $Na_2O$ | 6 to 0 |
| ZnO | 6 to 0 |
| CdO | 6 to 0 |
| BaO | 10 to 0 |
| SrO | 6 to 0 |
| $ZrO_2$ | 5 to 0 |
| $TiO_2$ | 5 to 0 |
| $La_2O_3$ | 7 to 0 |
| $Al_2O_3$ | 5 to 0 |
| $B_2O_3$ | 9 to 0 |
| $Sb_2O_3 + As_2O_3$ | 2 to 0 |

The glass preferably consists essentially of:

|  | weight percent |
|---|---|
| $SiO_2$ | 37 to 27 |
| PbO | 71 to 57 |
| $PbF_2$ | 10 to 0 |
| $BaF_2$ | 10 to 0 |
| $KHF_2$ | 9 to 0 |
| $K_2SiF_6$ | 7 to 0 |
| $Na_2SiF_6$ | 5 to 0 |
| $K_2O$ | 10 to 0 |
| $Na_2O$ | 5 to 0 |
| ZnO | 5 to 0 |
| CdO | 5 to 0 |
| BaO | 9 to 0 |
| SrO | 5 to 0 |
| $ZrO_2$ | 4 to 0 |
| $TiO_2$ | 4 to 0 |
| $La_2O_3$ | 6 to 0 |
| $Al_2O_3$ | 4 to 0 |
| $B_2O_3$ | 7 to 0 |
| $Sb_2O_3 + As_2O_3$ | 1 to 0 |

By the terms "consisting essentially of" we mean that in addition to the stated compositions, the glass may contain impurities and small amounts of incidental ingredients.

The reasons for the limits of the range of each component are as follows:

The composition has a small rate of shear wave propagation and has excellent homogeneity, durability and stability and the melting temperature is low and the preparation is easy.

The glass has the TCDT beyong the limits of the range $\pm 6.7 \times 10^{-5}/°$ C. in the range of $SiO_2 < 27\%$ or PbO $> 71\%$. The rate of shear wave propagation is too large whereby it is difficult to miniaturize it in the range of $SiO_2 > 42\%$ or PbO $< 52\%$.

The content of SiO₂ is preferably 37 to 27%, especially 36 to 30%. The content of PbO is preferably 71 to 57%, especially 64 to 58%.

From the viewpoint of lowering the melting temperature, it is preferable to contain the component of $K_2O$ or $Na_2O$, especially at a range of $K_2O + Na_2O$ of 1 to 10% because the durability of the glass is not good in the practical use as the delay medium, in the range of $K_2O > 12\%$ or $Na_2O > 6\%$.

The content of a small amount of ZnO, CdO, BaO, SrO, ZrO₂, TiO₂, La₂O₃, Al₂O₃ or B₂O₃ is effective for improving the durability and stability of the glass. However, the content is too much, a rate of shear wave propagation is too large. Accordingly, it is preferable to give the total content of 1 to 10%.

The content of a small amount of PbF, BaF₂, KHF₂, K₂SiF₆ or Na₂SiF₆ is effective for decreasing the melting temperature for more than 50° C. without deteriorating the characteristics of the glass as the delay medium. However, when the content is too much, devitrification is easily caused. Accordingly, it is preferable to give the total content 1 to 10%.

As refining agent, Sb₂O₃ and As₂O₃ can be incorporated.

The present invention will be further illustrated by certain examples.

The compositions and the rates of shear wave propagation (V), the temperature coefficients of delay time and the melting temperatures thereof are shown in Tables 1, 2, 3 and 4.

Table 1

| Sample No. | 1 | 2 | 3 | 4 | 5 | 6 | 7 | 8 | 9 | 10 |
|---|---|---|---|---|---|---|---|---|---|---|
| Composition wt% SiO₂ | 27 | 30 | 30 | 30 | 33 | 33 | 33 | 36 | 39 | 42 |
| PbO | 71 | 67 | 64 | 61 | 64 | 61 | 58 | 58 | 55 | 52 |
| K₂O | 2 | 3 | 6 | 9 | 3 | 6 | 9 | 6 | 6 | 6 |
| V (Km/sec) | 2.03 | 2.09 | 2.09 | 2.08 | 2.17 | 2.16 | 2.15 | 2.27 | 2.34 | 2.39 |
| Temp. Coefficient delay time ($\times 10^{-5}$/° C) | 6.2 | 5 | 5.5 | 5.6 | 3.5 | 4.5 | 4.8 | 3.5 | 2.5 | 1.5 |
| Melting temp. (° C) | 1080 | 1100 | 1050 | 1050 | 1150 | 1100 | 1100 | 1150 | 1200 | 1250 |

Table 2

| Sample No. | 11 | 12 | 13 | 14 | 15 | 16 | 17 | 18 | 19 | 20 | 21 |
|---|---|---|---|---|---|---|---|---|---|---|---|
| Composition (Wt.%) SiO₂ | 33 | 33 | 33 | 33 | 33 | 33 | 33 | 33 | 33 | 29 | 28 |
| PbO | 61 | 61 | 61 | 61 | 61 | 61 | 62 | 60 | 61 | 63 | 64 |
| K₂O | 3 | 3 | 3 | 3 | 3 | 3 | 3 | 3 | 3 | | 2 |
| ZnO | 3 | | | | | | | | | | |
| CdO | | 3 | | | | | | | | | |
| BaO | | | 3 | | | | | | | 8 | |
| SrO | | | | 3 | | | | | | | |
| ZrO₂ | | | | | 3 | | | | | | |
| TiO₂ | | | | | | 3 | | | | | |
| Al₂O₃ | | | | | | | 2 | | | | |
| B₂O₃ | | | | | | | | | | | 6 |
| La₂O₃ | | | | | | | | 4 | | | |
| Na₂O | | | | | | | | | 3 | | |
| V (Km/sec) | 2.15 | 2.18 | 2.21 | 2.23 | 2.24 | 2.23 | 2.21 | 2.23 | 2.15 | 2.08 | 2.27 |
| Temp. Coefficient delay time ($\times 10^{-5}$/° C) | 3.5 | 3.9 | 3.8 | 4.0 | 3.9 | 3.8 | 4.5 | 4.0 | 5.0 | 5.5 | 4.5 |
| Melting temp. (° C) | 1150 | 1150 | 1180 | 1180 | 1200 | 1200 | 1200 | 1200 | 1100 | 1080 | 1000 |

Table 3

| Sample No. | 22 | 23 | 24 | 25 | 26 | 27 | 28 | 29 |
|---|---|---|---|---|---|---|---|---|
| Composition (wt.%) SiO₂ | 27 | 30 | 30 | 30 | 33 | 33 | 33 | 36 |
| PbO | 71 | 67 | 64 | 53 | 51 | 61 | 58 | 58 |
| K₂O | 1 | 1 | 2.5 | 9 | 8 | 1 | 2 | 3 |
| Na₂O | | | | | | | | |
| PbF₂ | | | | 8 | | | | 1 |
| BaF₂ | | | | | 8 | | | |
| KHF₂ | | 2 | | | | | 7 | |
| K₂SiF₆ | 1 | | 3.5 | | | 5 | | 2 |
| Na₂SiF₆ | | | | | | | | |
| V (Km/sec) | 2.13 | 2.03 | 2.24 | 2.05 | 2.13 | 2.22 | 2.13 | 2.32 |
| Temp. Coefficient delay time ($\times 10^{-5}$/° C) | 4.0 | 4.5 | 6.0 | 4.8 | 3.0 | 3.5 | 4.0 | 2.5 |
| Melting temp. (° C) | 1020 | 1020 | 990 | 1000 | 1100 | 1030 | 1040 | 1100 |

Table 4

| Sample No. | 30 | 31 | 32 | 33 | 34 | 35 | 36 |
|---|---|---|---|---|---|---|---|
| Composition (Wt.%) SiO₂ | 39 | 42 | 33 | 33 | 33 | 33 | 33 |
| PbO | 55 | 52 | 61 | 61 | 57 | 61 | 61 |
| K₂O | 3 | 3 | 4 | 4.5 | 5 | 1 | 2 |
| Na₂O | | | | | 1 | 1 | |
| PbF₂ | | | | | 4 | | |
| BaF₂ | 1 | | | | | 4 | |
| K₂SiF₆ | 2 | 2 | 2 | | | | 4 |
| KHF₂ | | | | 1.5 | | | |
| Na₂SiF₆ | | 1 | | | | | |
| V (Km/sec) | 2.39 | 2.38 | 2.17 | 2.26 | 2.21 | 2.27 | 2.05 |
| Temp. Coefficient delay time ($\times 10^{-5}$/° C) | 1.5 | 2.0 | 2.0 | 4.0 | 3.5 3.0 | 2.5 | |
| Melting Temp. | | | | | | | |

Table 4-continued

| Sample No. | 30 | 31 | 32 | 33 | 34 | 35 | 36 |
|---|---|---|---|---|---|---|---|
| (° C) | 1140 | 1150 | 1020 | 1020 | 1040 | 1050 | 1000 |

As it is clear from the examples, the glass delay media for the ultrasonic delay line of the present invention have remarkably small rate of shear wave propagation (V) (those of the conventional ones are 2.80 to 2.60 Km/sec.), whereby the glass delay media could be miniaturized without increasing the number of reflections, that is, without increasing the spurious signals.

The melting temperatures of the glass are low as 990° to 1150° C. whereby the glass delay media could be easily prepared.

What we claim is:

1. In a solid ultrasonic delay line comprising an input transducer, a delay medium, and an output transducer, the improvement wherein said delay medium is a glass characterized by a rate of shear wave propagation not exceeding 2.40Km/sec., and which consists essentially of:

|  | Weight percent |
|---|---|
| $SiO_2$ | 42–27 |
| PbO | 71–52 |
| $PbF_2$ | 10–0 |
| $BaF_2$ | 10–0 |
| $KHF_2$ | 9–0 |
| $K_2SiF_6$ | 7–0 |
| $Na_2SiF_6$ | 5–0 |
| $K_2O$ | 12–0 |
| $Na_2O$ | 6–0 |
| ZnO | 6–0 |
| CdO | 6–0 |
| BaO | 10–0 |
| SrO | 6–0 |
| $ZrO_2$ | 5–0 |
| $TiO_2$ | 5–0 |
| $La_2O_3$ | 7–0 |
| $Al_2O_3$ | 5–0 |
| $B_2O_3$ | 9–0 |
| $Sb_2O_3 + As_2O_3$ | 2–0 | and wherein the composition of the glass includes 1–10 wt.% of $K_2O + Na_2O$.

2. In the solid ultrasonic delay line as claimed in claim 1, said glass having a rate of shear wave propagation not exceeding 2.30 Km/sec., and which consists essentially of:

|  | weight percent |
|---|---|
| $SiO_2$ | 37 – 27 |
| PbO | 71 – 57 |
| $PbF_2$ | 10 – 0 |
| $BaF_2$ | 10 – 0 |
| $KHF_2$ | 9 – 0 |
| $K_2SiF_6$ | 7 – |
| $Na_2SiF_6$ | 5 – 0 |
| $K_2O$ | 10 –0 0 |
| $Na_2O$ | 5 – 0 |
| ZnO | 5 – 0 |
| CdO | 5 – 0 |
| BaO | 9 – 0 |
| SrO | 5 – 0 |
| $ZrO_2$ | 4 – 0 |
| $TiO_2$ | 4 – 0 |
| $La_2O_3$ | 6 – 0 |
| $Al_2O_3$ | 4 – 0 |
| $B_2O_3$ | 7 – 0 |
| $Sb_2O_3 + As_2O_3$ | 1 – 0 | and wherein the composition of the glass includes 1–10 wt.% of $K_2O + Na_2O$.

3. The solid ultrasonic delay line claimed in claim 1, wherein the composition of the glass includes, 30 - 36 wt. % of $SiO_2$.

4. The solid ultrasonic delay line as claimed in claim 2, wherein the composition of the glass includes, 30 - 36 wt. % of $SiO_2$.

5. The solid ultrasonic delay line as claimed in claim 1, wherein the composition of the glass includes 58 - 64 wt. % of PbO.

6. The solid ultrasonic delay line as claimed in claim 2, wherein the composition of the glass includes 58 - 64 wt. % of PbO.

7. The solid ultrasonic delay line as claimed in claim 1, wherein the composition of the glass includes, 1 - 10 wt. % of $ZnO + CdO + BaO + SrO + ZrO_2 + TiO_2 + La_2O_3 + Al_2O_3 + B_2O_3$.

8. The solid ultrasonic delay line as claimed in claim 2, wherein the composition of the glass includes, 1 - 10 wt. % of $ZnO + CdO + BaO + SrO + ZrO_2 + TiO_2 + La_2O_3 + Al_2O_3 + B_2O_3$.

9. The solid ultrasonic delay line as claimed in claim 1, wherein the composition of the glass includes 1 - 10 wt. % of $PbF_2 + BaF_2 + KHF_2 + K_2SiF_6 + Na_2SiF_6$.

10. The solid ultrasonic delay line as claimed in claim 2, wherein the composition of the glass includes 1 - 10 wt. % of $PbF_2 + BaF_2 + KHF_2 + K_2SiF_6 + Na_2SiF_6$.

11. The solid ultrasonic delay line as claimed in claim 1, wherein the composition of the glass includes, 1 - 20 wt. % of $PbF_2 + BaF_2 + KHF_2 + K_2SiF_6 + Na_2SiF_6 + K_2O + Na_2O + ZnO + CdO + BaO + SrO + ZrO_2 + TiO_2 + La_2O_3 + Al_2O_3 + B_2O_3$.

12. The solid ultrasonic delay line as claimed in claim 2, wherein the composition of the glass includes, 1- 20 wt. % of $PbF_2 + BaF_2 + KHF_2 + K_2SiF_6 + Na_2SiF_6 + K_2O + Na_2O + ZnO + CdO + BaO + SrO + ZrO_2 + TiO_2 + La_2O_3 + Al_2O_3 + B_2O_3$.

* * * * *